April 15, 1924.

J. A. BRADLEY 1,490,556

SPRING TIRE

Filed Sept. 24, 1920

Inventor
Jacob A. Bradley

By Young & Young
Attorneys

Witness
T. P. Britt

Patented Apr. 15, 1924.

1,490,556

UNITED STATES PATENT OFFICE.

JACOB A. BRADLEY, OF MILWAUKEE, WISCONSIN, ASSIGNOR OF ONE-HALF TO ALBERT O. ANDERSON, OF SHAWANO, WISCONSIN.

SPRING TIRE.

Application filed September 24, 1920. Serial No. 412,424.

*To all whom it may concern:*

Be it known that I, JACOB A. BRADLEY, a citizen of the United States, and resident of Milwaukee, in the county of Milwaukee and State of Wisconsin, have invented certain new and useful Improvements in Spring Tires; and I do hereby declare that the following is a full, clear, and exact description thereof.

My invention relates to improvements in automobile tires, and has for an object to provide a tire which will be simple in construction, and which will embody a plurality of springs carried by the rim of a wheel and which are protected by a casing, thus providing a puncture proof tire.

The object of my invention, stated specifically, is to arrange the parts in such a manner that the springs may be easily detachable for replacement.

Other objects and advantages will be apparent as the nature of the invention is more fully disclosed, and it will of course be understood that certain changes in the structure of the invention may be resorted to within the scope of the appended claim.

Figure 1:
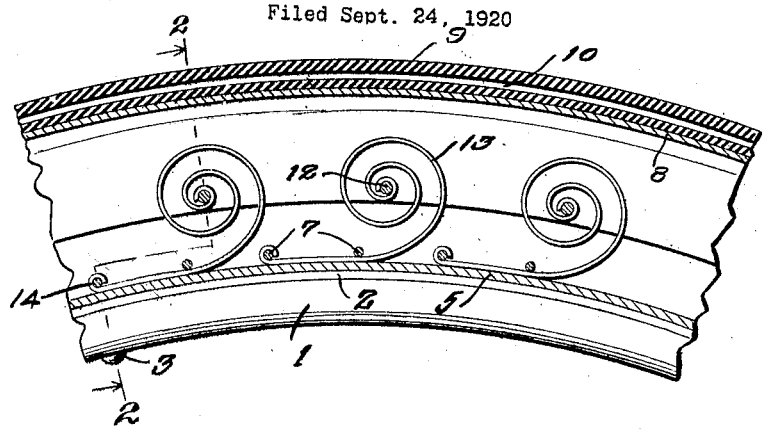
Figure 2:
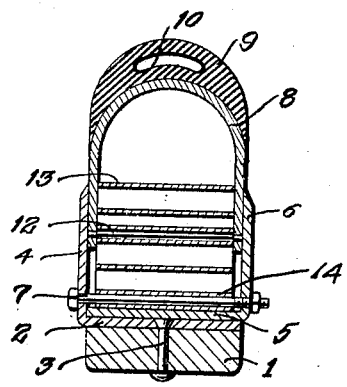

In the drawings forming a portion of this specification, and in which like numerals of reference indicate similar parts in the several views, Figure 1 is a partial view of a wheel showing in section one embodiment of my invention, and Figure 2 is a section on the line 2—2 of Figure 1.

Referring to the drawings, the numeral 1 designates a portion of a vehicle wheel rim having secured thereto a metal band 2 which, as I have shown in the drawings, is held to the rim by the bolts 3. The band 2 has the flange 4 extending upwardly therefrom. Adapted to fit over the band 2 is a second band 5 also provided with an upwardly extending flange 6 which is parallel with the flange 4 of the band 2.

Each of the flanges 4 and 6 are provided with a plurality of holes through which the bolts 7 pass and hold both sections together.

Fitting down between the flanges 4 and 6 is an inverted U-shaped metallic member 8 the base or top portion of which has applied thereto a suitable tread element 9 formed of rubber or the like and provided with an annular air pocket 10.

The sides of the member 8 are provided with openings 11 in which the spring retaining bars 12 are placed.

The springs 13 are spiral in form and have one end encircling the bar 12 while the other end passes under one of the bolts 7 and encircles the adjacent bolt as indicated at 14.

Assuming that one of the spring members become broken and it is desired to replace same with a new spring, the bolts 7 are first removed which releases the coacting end of the springs and permits the flange 6 to be removed. The member 8 is then slipped off the rim or band 2. In order to remove the spring holding bar the sides of the member 8 are sprung apart.

A tire and rim as herein set forth and described is extremely simple to manufacture, and it is thought that the construction, operation and many advantages of the herein described invention will be apparent to those skilled in the art.

Having thus fully described my invention, what I claim as new, and desire to secure by Letters Patent, is:—

A tire of the class described composed of an inverted U-shaped member adapted to be movable between a pair of retaining flanges, a resilient tread portion secured to the outer face of said member and having therein a cushioning chamber, bolts connecting the lower legs of said U-shaped member, transverse bolts passing through the side walls of said retaining flanges, and coiled springs connecting the first said bolts with the last said bolts.

In testimony that I claim the foregoing I have hereunto set my hand at Milwaukee, in the county of Milwaukee and State of Wisconsin.

JACOB A. BRADLEY.